United States Patent [19]

Masuda

[11] Patent Number: 4,584,900
[45] Date of Patent: Apr. 29, 1986

[54] STEERING WHEEL FOR AUTOMOTIVE VEHICLE COMPRISING AN INFLATABLE CORE AND THERMOSET RESIN COVER

[75] Inventor: Joji Masuda, Yokohama, Japan
[73] Assignee: Nissan Motor Co., Ltd., Yokohama, Japan
[21] Appl. No.: 197,697
[22] Filed: Oct. 16, 1980
[30] Foreign Application Priority Data Oct. 17, 1979 [JP] Japan ............... 54-132793

[51] Int. Cl.⁴ ............................... B62D 1/04
[52] U.S. Cl. ........................ 74/552; 74/558
[58] Field of Search ..................... 74/552, 558

[56] References Cited

U.S. PATENT DOCUMENTS

| 702,381 | 6/1902 | Seddon | 74/552 |
| 1,826,278 | 10/1931 | Flanigan | 74/552 |
| 2,913,923 | 11/1959 | Wilson | |
| 3,331,260 | 7/1967 | Zeller | 74/552 |

FOREIGN PATENT DOCUMENTS 1912534 10/1969 Fed. Rep. of Germany .
1630729  8/1971 Fed. Rep. of Germany .
2351747 10/1973 Fed. Rep. of Germany .
53-15245  2/1978 Japan .

Primary Examiner—Kenneth J. Dorner
Assistant Examiner—Rodney M. Lindsey
Attorney, Agent, or Firm—Schwartz, Jeffery, Schwaab, Mack, Blumenthal & Evans

[57] ABSTRACT

Disclosed is a steering wheel for an automotive vehicle, comprising a light weight expandable hollow member which is capable of maintaining its predetermined shape and defining therein a gas-sealed space, and a reinforced plastic material covering and in contact with the hollow member, thereby providing a necessary large cross-sectional area of at least the rim section of a steering wheel of decreased weight at low production cost and high production efficiency.

13 Claims, 12 Drawing Figures

STEERING WHEEL FOR AUTOMOTIVE VEHICLE COMPRISING AN INFLATABLE CORE AND THERMOSET RESIN COVER

BACKGROUND OF THE INVENTION

1. Field of the Invention

The present invention relates to an improvement in a steering wheel for an automotive vehicle, and an improvement in the method for producing the same.

2. Description of the Prior Art

Steering wheels of automotive vehicles are in general required to absorb reaction force from road surface during vehicle cruising to improve the driveability of the vehicle, and to be durable against impact of a vehicle collision. In order to meet these requirements, the steering wheel has employed a steel rod as the core of the rim section of the steering wheel so as to improve the resistance against impact and to enlarge the moment of inertia thereof, thereby absorbing the reaction force from the road surface and maintaining good driveability of the vehicle. However, the thus fabricated steering wheel has encountered the problems in which the weight thereof unavoidably increases and the cost thereof also increases, contributing to deterioration of the fuel economy of the vehicle.

SUMMARY OF THE INVENTION

According to an aspect of the present invention, a steering wheel for an automotive vehicle is essentially constructed of a light weight expandable hollow member which is capable of maintaining its predetermined shape and defining therein a gas-tight sealed space, and a reinforced plastic material covering and in contact with the hollow member.

According to another aspect of the present invention, the steering wheel is produced by firstly covering the outer surface of the expandable hollow member with the reinforced plastic material made of a thermosetting resin, secondly filling the space of the hollow member with a high pressure gas, and lastly heating the reinforced plastic material to solidify the plastic material.

The thus fabricated steering wheel is formed with a hollow section throughout the whole length of at least the rim section of the steering wheel, so that a light weight steering wheel having a necessary large cross-sectional area can be obtained with low production cost and high production efficiency, overcoming the drawbacks encountered in conventional steering wheels.

BRIEF DESCRIPTION OF THE DRAWINGS

The features and advantages of the steering wheel and the production method thereof according to the present invention will be more clearly appreciated from the following description taken in conjunction with the accompanying drawings in which like reference numerals designate the corresponding parts and elements throughout all the drawings, in which.

DETAILED DESCRIPTION OF THE INVENTION

Figure 1:
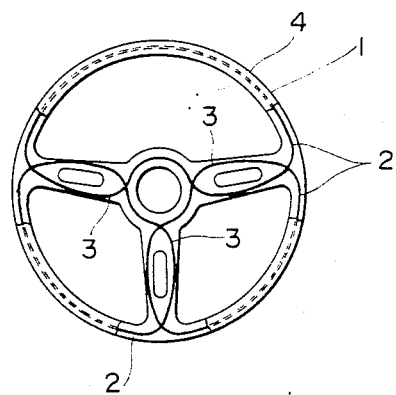
FIG. 1 is a plan view, partly in section, of a conventional steering wheel for an automotive vehicle.

To facilitate understanding the present invention, a brief reference will be made to the conventional steering wheel depicted in FIG. 1. The steering wheel is fabricated by integrally molding or forming a spoke section 3 and circular core materials 2 of a reinforced plastic, and additionally the circular core materials 2 for a rim section 1 are covered with polyurethane foam, thereby decreasing the weight thereof.

However, in order to obtain the rim section 1 having the cross-sectional area sufficient to render the operation thereof easy with the thus fabricated steering wheel, it is required to increase the cross-sectional area of the circular core materials, and/or to increase the amount of polyurethane foam used for the steering wheel. These will increase the steering wheel in weight and production cost. Such disadvantages are remarkable in steering wheels to be used for sporty cars, since the steering wheels for such cars require a large cross-sectional areas of the rim section. Additionally, in forming polyurethane foam integrally with the circular core materials, each circular core material is disposed within the polyurethane foam like a core for molding. Such an operation for disposing the circular core material within the polyurethane foam is considerably troublesome and difficult, thereby deteriorating the production efficiency thereof. In this connection, a steering wheel which is low in cost, high in production efficiency and light in weight has been earnestly desired.

Figure 2:
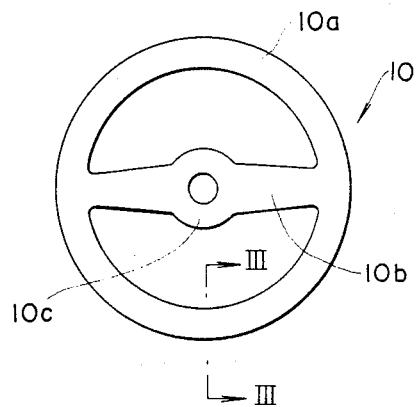
FIG. 2 is a plan view of a steering wheel for an automotive vehicle, in accordance with the present invention.
Figure 3:
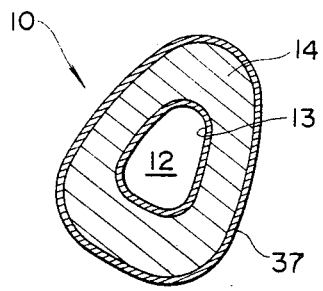
FIG. 3 is an enlarged cross-sectional view taken in the direction of arrows substantially along the line III—III of FIG. 2.

Referring now to FIGS. 2 and 3, there is shown an embodiment of a steering wheel 10 for use in an automotive vehicle, in accordance with the present invention. The steering wheel 10 is formed with a rim section 10a and a spoke section 10b. The rim section 10a comprises a hollow member 13 which is light in weight and capable of maintaining its predetermined shape, for example when filled with a gas. The hollow member 13 is an elastic tube maintaining a gas-tight seal property to define a space 12 therein, which tube is, for example, formed of a rubber. The hollow member 13 is filled with a high pressure gas, and the whole outer surface of the hollow member 13 is surrounded with a solidified reinforced plastic material. The reinforced plastic material contains a thermosetting resin which is capable of being solidified when heated.

Otherwise, the hollow member 13 may be formed of a cloth having large meshes and elasticity, which cloth is coated with a plastic film so that the cloth has gas-tight seal property. In this instance, the cloth coated with the plastic film is formed into the pipe shape. Such a pipe-shaped coated cloth is filled with a high pressure gas, and surrounded with the reinforced plastics material. It will be understood that the hollow member 13 may be formed of materials other than the above-mentioned elastic tube and cloth coated with the plastic film, so far as those materials are light in weight and is capable of maintaining its predetermined shape.

The reference numeral 37 designates an outer cover which is formed on the surface of the solidified reinforced plastic 14. which cover is formed, for example, of a leather, plastic or wood. While only the construction of the rim section 10a has been shown and described, it will be understood that the spoke section 10b may be formed into the same construction as that of the rim section 10a.

Subsequently, methods of producing the steering wheel according to the present invention, particularly of the rim section, will be explained hereinafter with reference to FIGS. 4A to 8B.

Figure 4A:
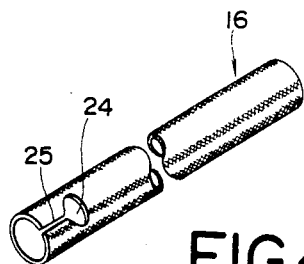
FIG. 4A is a perspective view of a pipe shape member usable for fabricating the steering wheel of FIG. 2.

The reinforced plastic material 14 is fabricated as shown in FIG. 4A, by initially forming a fibrous material such as carbon fiber or glass fiber, for example, into a pipe shape member 16 into which the elastic tube 13 is insertable, and then inserting the elastic tube 13 into the pipe shape member 16. Subsequently, a solution of a thermosetting resin 14 such as epoxy resin or unsaturated polyester resin is impregnated or attached to the pipe shape member 16.

Figure 4B:
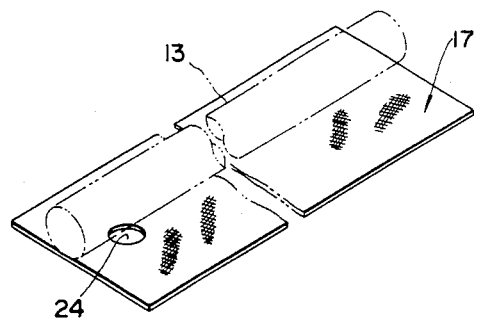
FIG. 4B is a perspective view of a cloth like member usuable for fabricating the steering wheel of FIG. 2.

Otherwise, the plastic material 14 may be constituted, as shown in FIG. 4B, by initially forming the above-mentioned fiber into a cloth like member 17, and then rolling up the cloth like member 17 around the elastic tube 13 to entirely cover the outer surface of the elastic tube 13. Thereafter, the above-mentioned solution of the thermosetting resin is impregnated or attached to the cloth like member 17.

Figure 5A:
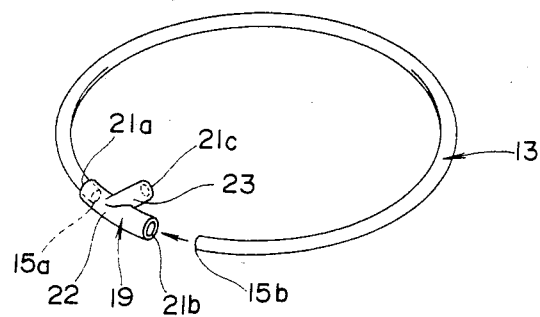
FIG. 5A is a perspective view of a hollow member with a T-shaped connecting pipe, usuable for producing the steering wheel of FIG. 2.
Figure 5B:
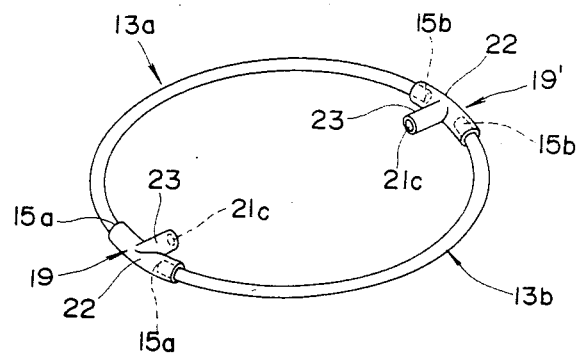
FIG. 5B is a perspective view similar to FIG. 5A, but showing the hollow member with two T-shaped connecting pipes.
Figure 7:
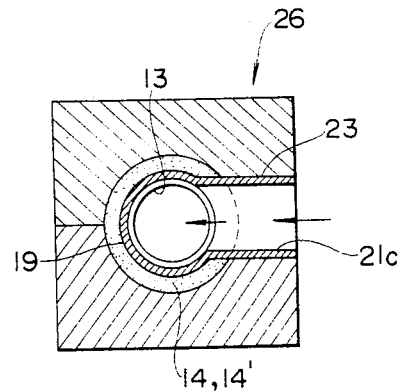
FIG. 7 is a cross-sectional view showing a step of production of the steering wheel of FIG. 2.

As shown in FIG. 5A, the elastic tube 13 opens at its ends 15a and 15b which are connectable with each other by a generally T-shaped connecting pipe 19. The T-shaped connecting pipe 19 is formed with two openings 21a and 21b which are located at the free ends of a curved pipe section 22, and with an opening 21c which is located at the free end of a straight pipe section 23 of the same. The ends 15a and 15b of the elastic tube 13 are inserted into the openings 21a and 21b, respectively, and therefore the inside of the elastic tube is assembled so as to maintain the gas-tight seal. A plurality of the T-shaped connecting pipes may be used as shown in FIG. 5B, in which the ends 15a and 15b of a first elastic tube 13a are connected to the respective ends 15a and 15b of a second elastic tube 13b by the two T-shaped connecting pipes 19 and 19'.

Figure 6:
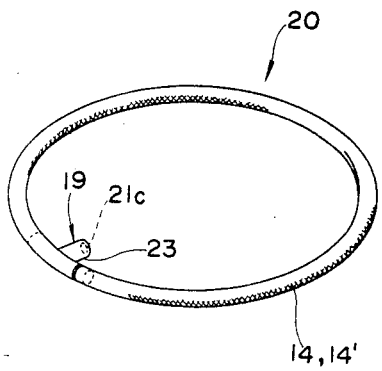
FIG. 6 is a perspective view of a ring like base member usuable for fabricating the steering wheel of FIG. 2.

It is to be noted that, although the curved pipe section 22 is covered with either the pipe shape member 16, the cloth like member 17 or the plastic material 14', the straight pipe section 23 is not covered with such a material so as to be exposed. In this regard, the pipe shape member 16 and the cloth like member 17 are formed with respective holes 24 which are previously formed as shown in FIGS. 4A and 4B. The straight pipe section 23 is projected from the hole 23 so that the curved pipe section 22 is fully covered with the above-mentioned material. As a result, a ring shape base member 20 is formed as shown in FIG. 6. In this connection, in case of using the pipe shape member as shown in FIG. 4A, the pipe shape member 16 is formed with a slit 25 connecting an end thereof with the above-mentioned hole 24 as shown in FIG. 4A.

In the process wherein the thermosetting resin solution is impregnated or attached to the pipe shape member 16 or the cloth like member 17, the opening 21c of the connecting pipe 19 is closed with any plug to prevent the thermosetting resin solution from entering the inside of the elastic tube 13. Additionally, the elastic tube 13 is so located and arranged that the outer surface thereof is in close contact with the inner surface of the pipe shape member 16 or the cloth like member 17 so as not to form a clearance therebetween.

Figure 4C:
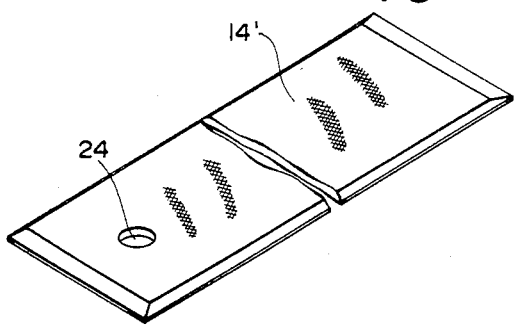
FIG. 4C is a perspective view of a reinforced plastic material which is usuable for fabricating the steering wheel of FIG. 2.

While the formation of the plastic material 14 has been shown and described only with reference to FIGS. 4A and 4B, the similar plastic material 14' in the plate shape may be formed in a manner shown in FIG. 4C, in which the thermosetting resin solution is impregnated into or attached onto the cloth like member 17 when the cloth like member is in the flat shape. This may be otherwise accomplished by mixing short fiber with the thermosetting resin solution to form the plate type plastic material 14'. The thus formed plastic material 14' is surrounded on the surface of the elastic tube 13. It will be appreciated that the cloth like materials mentioned previously used for preparing the members 16, 17 and 14' are formed by employing so-called bias-ply or radial-ply arrangement.

Subsequently, the ring like base member 20 is located within a mold cavity of a metallic mold 26, and additionally the opening 21c of the straight pipe section 23 of the T-shaped connecting pipe 29 is connected to a high pressure gas introducing pipe (not shown). Thereafter, the temperature of the mold 26 is raised to once soften the plastic material 14, 14', and additionally a high pressure gas is supplied into the elastic tube 13. Then, the elastic tube 13 expands by virtue of the high pressure gas supplied therein so as to press the reinforced plastic material 14, 14' against the surface of the mold cavity. In this state, the mold 26 is further heated to solidify the thermosetting resin so as to form the rim section 10a.

Otherwise, in case of using a plurality of the T-shaped connecting pipes 19 as shown in FIG. 5B, the openings 21c, 21c of the two connecting pipes 22, 22 are used as a high pressure gas inlet and a high pressure gas outlet, respectively, in which heated or superheated vapour is introduced into the elastic tube 13 to heat the plastic material 14, 14' from its inside. Preferably, the superheated vapour is superheated water vapour. This is advantageous from the view point of shortening the time required for solidifying the thermosetting resin. It will be understood that, also in the case of FIG. 5B, the high pressure gas may be supplied through the opening 21c of one connecting pipe, while the opening 21c of another connecting pipe may be closed.

Figure 8A:
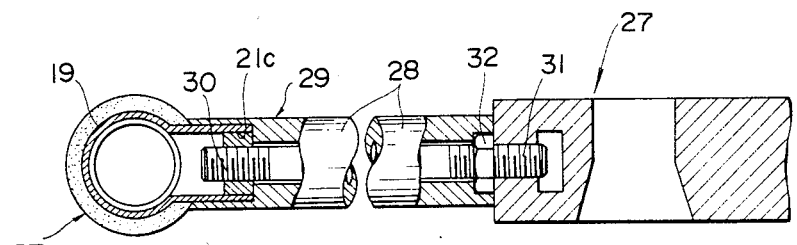
FIG. 8A is a cross-sectional view showing an example of the manner for connecting a rim member with a center member of the steering wheel.

Furthermore, a rim member 20 is connected to a center member 27 through the spoke or connecting member 29 in the following manner shown in FIG. 8A. In this instance, an end threaded section of the connecting member 29 which is covered with a plastic material 28 is screwed into a member (no numeral) securely disposed in the opening 21c of the connecting pipe 19.

The other end threaded section 31 is screwed into the central section 10c to be locked by a lock nut 31.

Figure 8B:
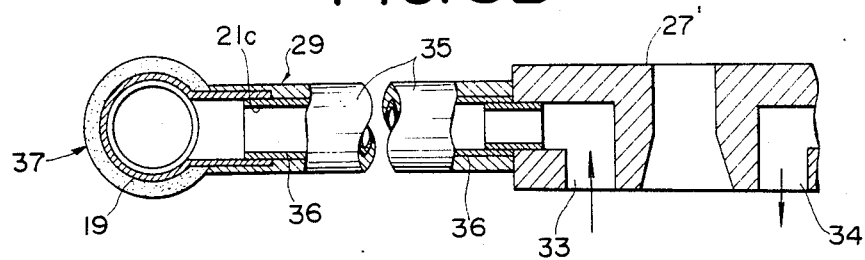
FIG. 8B is a cross-sectional view similar to FIG. 8A, but showing another example of the manner for connecting the rim member with the center member.

FIG. 8B shows another manner wherein the rim and spoke members 20, 29 are integrally formed. In this instance, the center member 27' is formed with a high pressure gas inlet 33 and a high pressure gas outlet 34. The gas inlet 33 is communicated with the opening 21c of the connecting pipe 29 through an elastic tube 36 covered with a plastic material 35, and the gas outlet 34 is communicated with the inside of the elastic tube 13. The thus arranged elastic tubes 13 are supplied with the high pressure gas from the gas inlet 33, and subsequently the whole of the thus arranged members are heat-treated to fabricate an assembly of the ring like base member 20, the spoke member 29 and the central member 27. Lastly, the outer surfaces of the thus formed base member 20 and/or spoke member 29 are covered with a cover material 37 formed of plastic, leather, or wood.

As appreciated from the above, according to the present invention, a reinforced plastic material entirely covers the surface of an elastic hollow member, such as an elastic tube, which is light in weight and capable of maintaining its predetermined shape. The hollow member is filled with a high pressure gas, and thereafter the thus fabricated article is heated, in its entirety, to solidify the plastic material. This results in an automotive vehicle steering wheel which is provided with a hollow section throughout the whole length of a rim section thereof, thereby obtaining the rim section which has a larger cross-sectional area sufficient to render steering wheel operation easy. Hence, a light weight steering wheel having a necessary cross-sectional area can be obtained with low production cost and with high production efficiency.

What is claimed is:

1. A steering wheel for an automotive vehicle, comprising:
   an expandable elastic hollow member which is light in weight and capable of maintaining its predetermined shape, said hollow member defining therein a gas-tight sealed space; and
   a reinforced plastic material comprising a thermoset resin covering and in contact with said hollow member, said thermoset resin having a sufficient rigidity to render the steering wheel self-supporting in an expanded state.

2. A steering wheel as claimed in claim 1, further comprising a high pressure gas filled in said space of said hollow member.

3. A steering wheel as claimed in claim 1, wherein said hollow member is an elastic tube.

4. A steering wheel as claimed in claim 3, wherein said elastic tube is made of a rubber.

5. A steering wheel as claimed in claim 3, wherein said elastic tube includes a generally cylindrical elastic mesh cloth, and a plastic film layer formed on said cylindrical mesh cloth.

6. A steering wheel as claimed in claim 1, wherein said plastic material includes a generally cylindrical member, and a plastic material associated with said cylindrical member.

7. A steering wheel as claimed in claim 6, wherein said cylindrical member is formed of a fiber.

8. A steering wheel as claimed in claim 7, wherein said fiber is one selected from the group consisting of carbon fiber, and a glass fiber.

9. A steering wheel as claimed in claim 1, wherein said thermoset resin is one selected from the group consisting of epoxy resin, and unsaturated polyester resin.

10. A steering wheel as claimed in claim 1, further comprising a cover material covering the surface of said reinforced plastic material.

11. A steering wheel as claimed in claim 10, wherein said covering material is selected from the group consisting of leather, plastic, and wood.

12. A steering wheel for an automotive vehicle as claimed in claim 1 produced by the process comprising the steps of:
    providing a light weight, expandable hollow member which is capable of maintaining its predetermined shape and which defines a gas-tight sealed space;
    covering the outer surface of said hollow member with a reinforced plastic material comprising a thermosetting resin;
    filling said sealed space of said hollow member with a high pressure gas; and
    thermosetting said thermosetting resin.

13. A steering wheel produced by the process according to claim 12, further comprising the step of releasing said high pressured gas from said sealed space subsequent to said thermosetting step.

* * * * *